United States Patent [19]

Leinweber

[11] Patent Number: 4,721,439

[45] Date of Patent: Jan. 26, 1988

[54] PISTON PUMP AND DRIVE THEREFOR

[75] Inventor: Guenter Leinweber, Lahnau, Fed. Rep. of Germany

[73] Assignee: Wiwa Wilhelm Wagner GmbH & Co. KG, Lahnau, Fed. Rep. of Germany

[21] Appl. No.: 863,579

[22] Filed: May 15, 1986

[51] Int. Cl.⁴ .......................... F04B 9/02; F16H 47/04
[52] U.S. Cl. ..................... 417/319; 417/212; 417/223; 74/687; 74/790; 74/720
[58] Field of Search .............. 417/319, 212, 214, 223, 417/15; 74/790, 720, 687

[56] References Cited

U.S. PATENT DOCUMENTS

| | | | |
|---|---|---|---|
| 2,390,240 | 12/1945 | DeLancey | 74/687 |
| 2,441,779 | 5/1948 | Troeger et al. | 417/212 X |
| 3,505,908 | 4/1970 | Herrmann | 74/790 |
| 3,665,788 | 5/1972 | Nyman | 74/687 X |
| 4,009,971 | 3/1977 | Krohn et al. | 417/223 X |
| 4,118,151 | 10/1978 | Murakami et al. | 417/223 |

FOREIGN PATENT DOCUMENTS

| | | | |
|---|---|---|---|
| 1528467 | 8/1969 | Fed. Rep. of Germany | 417/319 |
| 151208 | 10/1981 | German Democratic Rep. | 417/319 |
| 11472 | 1/1986 | Japan | 417/319 |
| 539230 | 9/1941 | United Kingdom | 417/223 |

Primary Examiner—Carlton R. Croyle
Assistant Examiner—Paul F. Neils
Attorney, Agent, or Firm—Flynn, Thiel, Boutell & Tanis

[57] ABSTRACT

A device for a drive for pumps with a constant holding and preset operating pressure, has, in order that it can be driven by a commercially available electric motor which can continue running with a closed spray gun, a differential gear with an input shaft (15) for the connection of the motor and two output shafts (8, 30) for connection to the pump and a series connected hydraulic pump and adjustable throttle valve.

3 Claims, 3 Drawing Figures

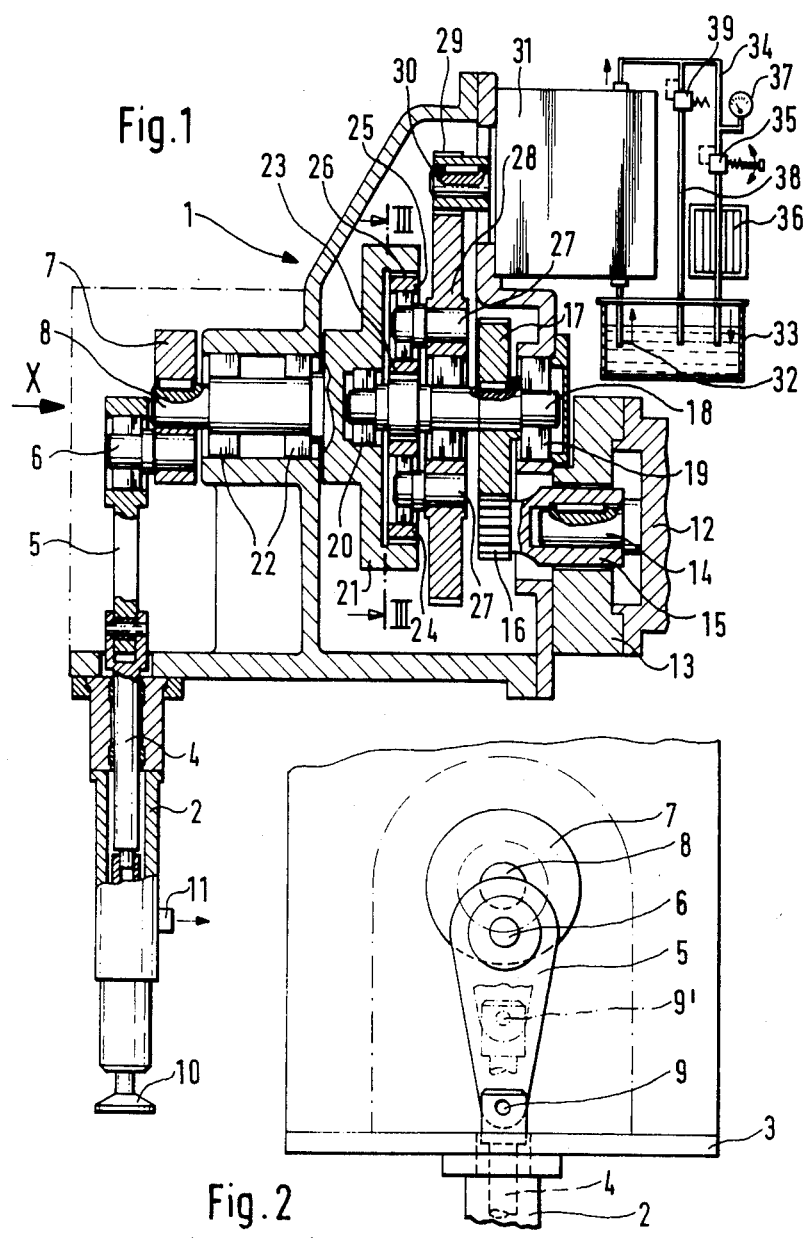

PISTON PUMP AND DRIVE THEREFOR

FIELD OF THE INVENTION

The invention relates to a device for effecting a drive of a pump at a constant holding and preset operating pressure.

BACKGROUND OF THE INVENTION

Airless spraying of high-viscosity as well as low-viscosity materials has found increasing acceptance particularly since no or only insignificant spray-mist problems occur, since there is no paint bounce-back from corners and recesses, and since a clean environment is maintained.

In addition, highly-viscous materials can be used without difficulties and in higher film thicknesses. A complete filling of pores on any substrate is obtained resulting in improved adhesion and, thus, in an application of better quality.

The method of operation for the so-called airless spray method consists in a high-pressure pump which draws the spray material from any type of container by suction and delivers it to a spray gun by means of a special hose under high hydraulic pressure. Through a specially shaped nozzle the material is atomized without air into minute droplets and applied to the workpiece at high velocity. This makes it possible to cover edges and corners of complicated workpieces as uniformly as smooth surfaces.

One problem in the airless-spay method consists in the requirement that a high holding pressure must also be maintained during idle times in order to make it possible to continue spraying immediately and with the same quality. Piston pumps and in particular differential piston pumps serve as high-pressure pumps. As a drive motor, either an inline or rotary motor can be used. In the rotary motor, the rotational motion of the motor is converted into a reciprocating motion for the movement of the piston. This is accomplished by mounting to the drive-motor shaft an eccentric disk which is connected to the piston rod of the piston pump by means of a connecting rod. In the top dead center and bottom dead center of the piston rod travel no material is being moved which results in an uneven spray pattern. These fluctuations in the spray pattern increase with the amount of material exiting the spray nozzle. It is not possible to prevent this fluctuating spray pattern with presently known means.

A compressed-air driven, inline motor serves primarily as a driver for the piston of the piston pump since this motor allows for infinitely variable material pressure whereby the amount of material regulates itself. The compressed-air motor only operates with an open spray gun; it stops, however, after the spray gun is closed and resumes running as soon as the gun is opened again. Its running speed is automatically governed by the flow-rate at the spray nozzle.

Problems occur with the use of other drive motors since the spray pressure in the spray gun must be maintained during idle time. With the use of electric motors, one, therefore, installed a spill valve which recirculates the unused, excess paint. The disadvantage of this system consists on the one hand in an increase in pump wear and, on the other hand, in a continuous circulation of paint material which is not permissible with filler paints, for example. Furthermore, the insertion of a hydraulic circuit between motor and pump is known.

This has the disadvantage that a very high pressure drop occurs at the dead centers due to the inertia of the hydraulic circuit. The pressure drop which amounts to approximately 5 to 10% in a mechanical circuit assumes considerably higher values in a hydraulic circuit. This restricts the use of such units to applications in which demands for quality are low.

In addition, DC motors have been used recently as drive motors which are controlled and which make it possible, therefore, to stop and restart under load. However, the expenditure for control technology is considerable and makes this drive expensive; furthermore, this drive is also susceptible to malfunctions due to the frequently very rough use in shipyards, construction sites, etc.

Basic to the invention is the provision of a device for the drive of pumps with constant holding and preset operating pressure which makes it possible to use a commercially available electric motor, gasoline engine, or also air motor, which can continue running even with a closed spray gun; which makes it possible to make infinitely variable adjustments to the operating pressure between a value maximally limited by the pump and zero; and which, in addition, when used in connection with piston pumps considerably decreases the pressure fluctuations in the spray stream as compared to presently known pump configurations.

A device according to the invention for the drive of pumps has, therefore, a differential gear, whereby the drive motor is connected to the drive shaft. E.g., an electric motor, a combustion engine, or also an air motor can be used as a drive motor. This drive motor runs continuously with a defined rpm. The pump is connected to one of the two output shafts of the differential gear; to the other a brake unit is connected which preferably consists of a hydraulic pump with a hydraulic circuit in which an adjustable throttle valve is inserted. The pressure of the pump is regulated by means of the brake unit. When the spray gun is closed and thus no material is moved, the pressure in the pump increases to such a level that the output shaft of the differential gear connected to the pump is retarded to zero. Because of the differential gear, only the output shaft leading to the brake unit continues to be driven. Thus, the motor can continue to run with the spray gun closed without being damaged while the previously selected operating pressure is being maintained at the pump.

A further advantage of a device according to the invention for the drive of pumps consists in the fact that based on the employed differential gear with the use of a piston pump, the pressure drop at the dear centers, i.e., the points of reversal of the piston, is no longer as large as with known pump drives because, due to the use of the differential gear, the rpm of the drive shaft of the piston pump increases quite considerably, especially in the dead centers, as compared to the speeds at a corresponding angle of 90° because the resistance has been considerably reduced due to the small load in these ranges. The result is that the time interval of pressure-drop as compared to the intervals with normal operating pressure has decreased to such a considerable percentage that this pressure drop can hardly be noticed in the spray pattern and this even with high pump loads.

BRIEF DESCRIPTION OF THE DRAWINGS

In the following, an exemplary embodiment of the invention is described in more detail based on the drawing, in which:

FIG. 1 is a sectional view of a device designed according to the invention;

FIG. 2 is a top view of FIG. 1 in direction of arrow X; and

DETAILED DESCRIPTION

Figure 3:
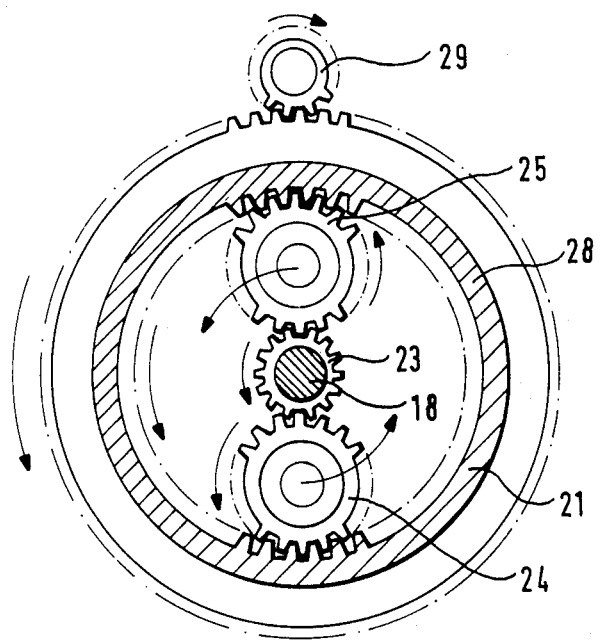
FIG. 3 is a sectional view taken along the line III—III in FIG. 1.

The drive device 1 represented in the figures serves to drive a piston pump 2 which is flange-mounted to housing 3 of the drive device 1. The piston 4 of the piston pump 2 is articulated to a connecting rod 5 which is articulated in its other end to a pin 6 which is connected on an eccentric disk 7 which in turn is mounted on an output shaft 8 of the drive device 1. The output shaft 8 drives the eccentric disk 7 which is rigidly connected to it so that the piston 4 of the piston pump 2 executes a motion between the positions of the connecting points 9 and 9' as illustrated in FIG. 2 which represent at the same time the dead centers; i.e., the points of reversal of the motion of the piston rod 4.

The piston pump 2 is immersed at its end 10 in a not-illustrated container for the material to be sprayed. Due to the motion of piston 4 of the piston pump 2, the material is discharged under pressure from discharge outlet 11. In the known manner, a pressure hose is connected to this outlet which leads to a spray gun. Furthermore, the piston pump 2 is advantageously designed as a known differential piston pump.

A motor 12 which is bolted to a flange 13 of housing 3 serves as a drive for the piston pump 2. Preferably, an electric motor is used here. Shaft 14 of motor 12 is rigidly connected with drive shaft 15 of the drive device 1. Rigidly connected to the input shaft 15 is a gear 16 which meshes with a further gear 17 which is rigidly connected to a shaft 18.

The end of shaft 18 is supported by a bearing 19 in housing 1, while the opposite end of shaft 18 rests in a bearing 20 in a carrier 21 which is rigidly connected to output shaft 8. Output shaft 8 rests in bearing 22 in the housing 3.

With shaft 18, a second gear 23 is rigidly connected with which two gears 24, 25 mesh, which in turn mesh with an internal gearing 26 of carrier 21. Each one of the two gears 24, 25 possess a bearing-mounted shaft 27 whose opposite end rests in a gear 28. This gear 28, in turn, meshes with gear 29 which is rigidly mounted on output shaft 20.

This output shaft 30 drives a hydraulic pump 31 which is flange-mounted to the housing 3 of the drive device. By means of a suction pipe 32, hydraulic fluid is drawn from a tank 33 and is returned to tank 33 via a circuit 34, which includes a throttle valve 35, and a heat exchanger 36. The selected pressure can be read by means of manometer 37. Parallel to circuit 34 is circuit 38 which includes a safety valve 34 which limits oil pressure to a maximal pressure.

OPERATIONS

The device operates as follows. The input shaft 15 driven by motor 12 drives the gear 17 and thus shaft 18. At the same time, by means of gear 23, the two gears 24, 25 are driven which mesh with the internal gearing 26 of the carrier 21. These gears 24, 25 drive the carrier 21 and thus the output shaft 8 on which the eccentric disk 7 is mounted. By means of connecting rod 5, the piston 4 of piston pump 2 is driven according to the rpm of the output shaft 8. If no more material is discharged via the spray gun, the pressure in piston pump 2 increases with the result that the resistance of the force exerted by piston 4 on output shaft 8 becomes so great that output shaft 8 stops to rotate and thus also carrier 21. Shaft 18, however, continues to be driven by motor 12. Via the two gears 24, 25, which form the differential gears, only gear 28 is now being driven which, through gear 29, drives the output shaft 30 and thus the hydraulic pump 31 which functions as an adjustable brake unit for controlling the speed of rotation of the gears 24, 25 and gear 28 about the axis of the shaft 18. The adjustable brake unit includes, in addition to the hydraulic pump 31, a hydraulic circuit in which an adjustable throttle valve 35 is provided. The amount of hydraulic fluid pumped by the hydraulic pump 31 is regulated by the speed at which the output shaft 30 is driven by the gear 28 and the throttle valve 35. At that moment when material is sprayed again, the force exerted by the piston rod through the eccentric onto the output shaft 8 is reduced so that carrier 21 is now driven by the differential gears 24, 25. If one examines FIG. 2, then the piston pump 2 performs the greatest work between the two positions 9 and 9' of its piston 4. In the dead centers 9 and 9', however, no work is performed since the piston reverses its direction of motion here. The force which is exerted by the piston rod onto the eccentric disk and thus onto output shaft 8 decreases very rapidly in the vicinity of the dead centers toward the particular dead center. As a result, the speed at which the output shaft 30 is driven varies due to the variable resistance offered by the pump 2 at the dead center positions 9 and 9'.

Through this reduced opposing force, the resistance force offered by the hydraulic pump 31 brings the gear 28 to a halt which causes the output shaft 8 to be driven faster due to the differential gear so that the range of the piston pump in which little or nothing is being moved is passed considerably faster than is the case with a drive with constant rpm of the output shaft. By these means the reversal time of the piston pump, and thus the time in which the pump cannot resupply the amount of material demanded by the spray gun without loss in pressure, is reduced to such a degree that this reversal process can hardly still be noticed in the spray pattern and by these means a uniform spray pattern is obtained.

As a motor, an electric motor; e.g., an AC motor, but also a gasoline engine or diesel engine can be used. Furthermore, it is also possible to use a compressed-air rotary motor. A drive according to the invention is furthermore also not restricted to piston pumps but rather it can be employed with other types of pumps to the same advantage. In any case, a device according to the invention allows the use of motors which can continue to run even if no material is being discharged at the spray gun.

The embodiments of the invention in which an exclusive property or privilege is claimed are defined as follows:

1. A piston pump for use in the airless spraying of liquids, said piston pump having a reciprocal piston therein, and a drive means for effecting a reciprocating of said piston, comprising:

a first rotatable shaft and first connecting means for facilitating connection of said first shaft to a drive motor, differential gear means having a first rotatable input shaft and first and second output shafts, said differential gear means including means for effecting, when a load is applied to said second output shaft, (1) a rotating of said second output shaft in response to a stoppage of rotation of said first output shaft and (2) an acceleration and deceleration in the speed of rotation of said first output shaft as the load applied thereto is decreased and increased, respectively;

second connecting means for connecting said first rotatable shaft to said first rotatable inupt shaft;

an eccentric disk connected to said first output shaft, a connecting rod interconnecting said eccentric disk to said reciprocal piston for reciprocating said piston and causing an outflow of fluid from said piston pump;

a hydraulic circuit comprising a series connected hydraulic pump and an adjustable throttle valve; and third connecting means for connecting said second output shaft to said hydraulic pump for placing a rotation resisting load on said second output shaft so that as said reciprocal piston approaches its two dead center positions, the work performed by said piston will be reduced and a force exerted by said connecting rod on said eccentric disk and said first output shaft will be reduced to thereby cause said first output shaft to rotate faster to move said piston quickly through said dead center positions and the non-uniformity of said outflow of fluid from said piston pump to be reduced.

2. The device according to claim 1, wherein a heat exchanger is series connected with said hydraulic pump and said adjustable throttle valve in said hydraulic circuit.

3. The device according to claim 1, including a housing means, wherein said differential gear means is mounted inside said housing means, wherein said first rotatable input shaft and said first and second output shafts extend through openings provided in said housing means so that access thereto is provided, said differential gear means including a first gear fixedly mounted on said first rotatable shaft which is rotatably supported in said housing means, said first gear meshingly engaging plural gears rotatably mounted on a rotatably supported second gear, and wherein said third connecting means provides a connection of said second gear to said second output shaft, and wherein a third gear is provided which encircles and meshingly engages said plural gears and defines a carrier having said first output shaft affixed thereto.

* * * * *